(12) United States Patent
Galasso et al.

(10) Patent No.: US 10,704,640 B2
(45) Date of Patent: *Jul. 7, 2020

(54) APPARATUS AND METHODS FOR A VEHICLE SHOCK ABSORBER

(71) Applicant: Fox Factory, Inc., Braselton, GA (US)

(72) Inventors: Mario Galasso, Sandy Hook, CT (US); Dennis K. Wootten, Milford, NH (US); Bryan Wesley Anderson, Santa Cruz, CA (US)

(73) Assignee: Fox Factory, Inc., Braselton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,954

(22) Filed: Mar. 22, 2019

(65) Prior Publication Data

US 2019/0219122 A1 Jul. 18, 2019

Related U.S. Application Data (63) Continuation of application No. 15/808,645, filed on Nov. 9, 2017, now Pat. No. 10,240,655, which is a continuation of application No. 14/993,861, filed on Jan. 12, 2016, now Pat. No. 9,816,578, which is a continuation of application No. 14/330,850, filed on Jul. 14, 2014, now Pat. No. 9,255,620, which is a continuation of application No. 12/794,219, filed on Jun. 4, 2010, now Pat. No. 8,807,542.

(Continued)

(51) Int. Cl.
*F16F 9/06* (2006.01)

(52) U.S. Cl.
CPC ................ *F16F 9/065* (2013.01); *F16F 9/06* (2013.01)

(58) Field of Classification Search
CPC .... F16F 9/06; F16F 9/063; F16F 9/065; F16F 9/486; F16F 9/0209; B60G 15/12; B64C 25/60; B64C 2700/6242
USPC ...... 188/314, 322.14, 318, 319.2; 267/64.15, 267/118, 126, 64.16, 186, 124; 280/124.158, 124.16, 124.162, 64.28
See application file for complete search history.

(56) References Cited

U.S. PATENT DOCUMENTS 2,974,946 A * 3/1961 Tuczek .................. B60G 17/04
267/64.16
3,039,761 A 6/1962 Van Zijp
(Continued)

FOREIGN PATENT DOCUMENTS

| EP | 1637368 A2 | 3/2006 |
| EP | 1754909 A1 | 2/2007 |

(Continued)

OTHER PUBLICATIONS

"European Search Report for European Application No. 10165114, 4 pages, Sep. 13, 2017 (Sep. 13, 2017)".

*Primary Examiner* — Robert A. Siconolfi
*Assistant Examiner* — San M Aung (57) ABSTRACT

A method and apparatus for a vehicle shock absorber comprising a main damper cylinder, a first reservoir and a second reservoir. One embodiment includes a first operational mode where both reservoirs are in fluid communication with the cylinder. In a second operational mode, only one reservoir communicates with the cylinder during fluid evacuation from the cylinder. In each mode, rebound from either or both reservoirs may travel through a single, user-adjustable metering device.

16 Claims, 9 Drawing Sheets

Related U.S. Application Data (60) Provisional application No. 61/184,763, filed on Jun. 5, 2009.

(56) References Cited

U.S. PATENT DOCUMENTS

| | | | |
|---|---|---|---|
| 3,499,639 A | 3/1970 | Bonnotte | |
| 3,527,452 A * | 9/1970 | Hausenblas | F16F 9/096 |
| | | | 267/126 |
| 4,049,251 A | 9/1977 | Masae | |
| 4,478,431 A * | 10/1984 | Muller | B60G 11/30 |
| | | | 267/64.25 |
| 4,655,440 A | 4/1987 | Eckert | |
| 5,016,909 A * | 5/1991 | Lin | B60G 17/0152 |
| | | | 188/314 |
| 5,044,614 A | 9/1991 | Rau | |
| 5,553,836 A | 9/1996 | Ericson | |
| 5,803,443 A | 9/1998 | Chang | |
| 6,135,434 A | 10/2000 | Marking | |
| 6,311,962 B1 | 11/2001 | Marking | |
| 6,360,857 B1 | 3/2002 | Fox et al. | |
| 7,163,222 B2 | 1/2007 | Becker et al. | |
| 7,219,881 B2 | 5/2007 | Denk | |
| 7,293,764 B2 | 11/2007 | Fang | |
| 7,374,028 B2 | 5/2008 | Fox | |
| 8,807,542 B2 | 8/2014 | Wootten et al. | |
| 9,816,578 B2 | 11/2017 | Galasso et al. | |
| 10,240,655 B2 | 3/2019 | Galasso et al. | |
| 2005/0012255 A1 * | 1/2005 | Denk | B60G 17/0432 |
| | | | 267/64.15 |
| 2009/0236807 A1 | 9/2009 | Wootten et al. | |
| 2016/0123424 A1 | 5/2016 | Galasso et al. | |
| 2018/0066724 A1 | 3/2018 | Galasso et al. | |

FOREIGN PATENT DOCUMENTS

| | | | |
|---|---|---|---|
| IT | 1224038 B | 9/1990 | |
| JP | S60193708 A | 10/1985 | |
| JP | 61021814 A * | 1/1986 | B60G 17/04 |
| JP | S6121814 A | 1/1986 | |
| JP | 61021814 Y2 | 6/1986 | |
| WO | 03102426 A2 | 12/2003 | |

\* cited by examiner

APPARATUS AND METHODS FOR A VEHICLE SHOCK ABSORBER

CROSS-REFERENCE TO RELATED APPLICATIONS

This application is a continuation application of and claims the benefit of co-pending U.S. patent application Ser. No. 15/808,645, filed on Nov. 9, 2017, entitled "APPARATUS AND METHODS FOR A VEHICLE SHOCK ABSORBER" by Mario Galasso et al., which is incorporated herein, in its entirety, by reference and is assigned to the assignee of the present application.

The Ser. No. 15/808,645 application is a continuation application of and claims the benefit of U.S. patent application Ser. No. 14/993,861, filed on Jan. 12, 2016, now U.S. Pat. No. 9,816,578, entitled "APPARATUS AND METHODS FOR A VEHICLE SHOCK ABSORBER" by Mario Galasso et al., which is incorporated herein, in its entirety, by reference and is assigned to the assignee of the present application.

The Ser. No. 14/993,861 application is a continuation application of and claims the benefit of U.S. patent application Ser. No. 14/330,850, filed on Jul. 14, 2014, now U.S. Pat. No. 9,255,620, entitled "APPARATUS AND METHODS FOR A VEHICLE SHOCK ABSORBER" by Mario Galasso et al., which is incorporated herein, in its entirety, by reference and is assigned to the assignee of the present application.

The Ser. No. 14/330,850 application is a continuation application of and claims the benefit of patented U.S. patent application Ser. No. 12/794,219, filed on Jun. 4, 2010, now U.S. Pat. No. 8,807,542, entitled "APPARATUS AND METHODS FOR A VEHICLE SHOCK ABSORBER" by Mario Galasso et al., which is incorporated herein, in its entirety, by reference and is assigned to the assignee of the present application.

The U.S. Pat. No. 8,807,542 claims priority to and the benefit of U.S. Provisional Patent Application 61/184,763 filed on Jun. 5, 2009, entitled "METHODS AND APPARATUS FOR DUAL CHAMBER SUSPENSION" by Mario Galasso et al., which is incorporated herein, in its entirety, by reference and is assigned to the assignee of the present application.

BACKGROUND OF THE INVENTION

Field of the Invention

Embodiments of the present invention generally relate to a suspension system, more particularly, a shock absorber with multiple reservoir chambers (IFPs), especially one permitting selective communication between the reservoirs and a main damper chamber.

Description of the Related Art

Figure 1:
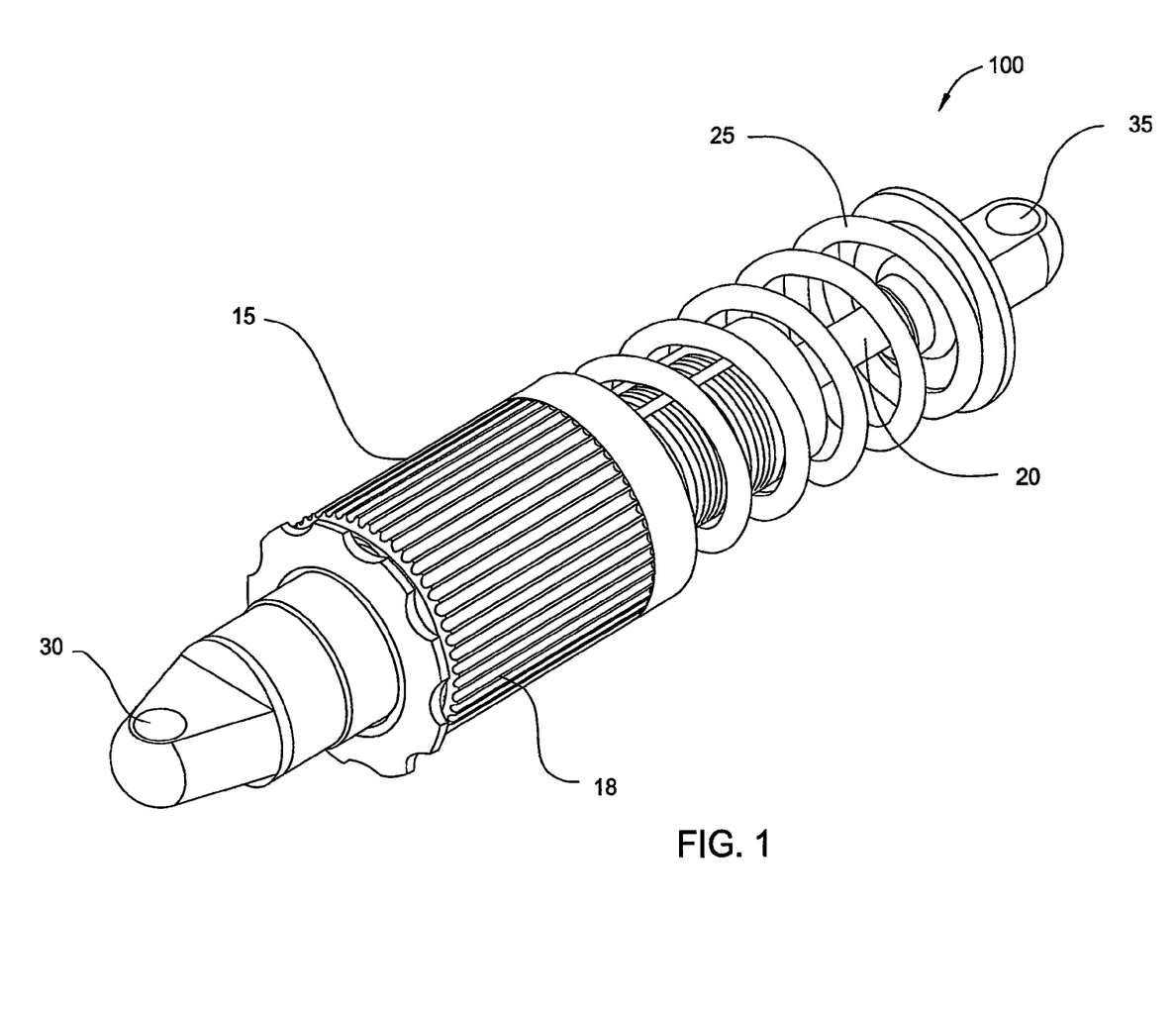
FIG. 1 is a perspective view of a shock absorber including a damper and a spring.

Integrated damper/spring vehicle shock absorbers often include a damper body surrounded by a mechanical spring. The damper consists of a piston and shaft telescopically mounted in a fluid filled cylinder. The purpose of the damper is to control the speed at which the shock absorber operates. The mechanical spring provides resistance to shock events and may be a helically wound spring that surrounds the damper body. Various integrated shock absorber configurations are described in U.S. Pat. Nos. 5,044,614, 5,803,443, 5,553,836 and 7,293,764; each of which is herein incorporated in its entirety by reference. A shock absorber of U.S. Pat. No. 7,293,764 is shown herein as FIG. 1. As shown, the shock absorber 10 comprises a damper assembly 15 consisting of a chamber 18 housing a piston (not shown) and rod 20 and a helical spring 25 disposed on the damper in a manner whereby the spring and damper operate together. The shock absorber is attached via eyeholes 30, 35 to separate portions of a vehicle (not shown) and the shock operates when there is relative movement between those portions.

Various arrangements permit aspects of the shock absorber to be adjusted or changed by an end user. For example, U.S. Pat. No. 5,044,614 ("614 patent") shows a damper body carrying a thread 42. A helical spring 18 surrounds the damper body. The compression in the helical spring 18 may be pre-set by means of a nut 48 and a lock nut 50. The nut 48 may be translated axially relative to the body ("tube") 16 and thread 42 by rotating the nut 48 around the threaded sleeve 42. Rotation of the nut 48 in a given direction (e.g. clockwise as viewed from end 44 for a right hand thread 42) will cause the nut to move toward the retainer clip 26 thereby compressing spring 18 between the nut 48 and the retainer clip 26. Once the spring 18 is in a desired state of compression, lock nut 50 is rotated, using a wrench, up against nut 48 and tightened in a binding relation therewith.

Some shock absorbers utilize gas as a spring medium in place of, or in addition to, mechanical springs. Gas spring type shock absorbers, having integral dampers, are described in U.S. Pat. Nos. 6,135,434, 6,360,857 and 6,311,962, each of which is herein incorporated in its entirety by reference. U.S. Pat. No. 6,360,857 shows a shock absorber having selectively adjustable damping characteristics. U.S. Pat. No. 7,163,222, which is incorporated herein in its entirety by reference, describes a gas sprung front shock absorber for a bicycle (a "fork") having a selective "lock out" and adjustable "blow off" function.

The spring mechanism (gas or mechanical) of some shock absorbers is adjustable so that it can be preset to varying initial states of compression. In some instances, the shock spring (gas or mechanical) may comprise different stages having varying spring rates thereby giving the overall shock absorber a compound spring rate depending varying through the stroke length. In that way the shock absorber can be adjusted to accommodate heavier or lighter carried weight, or greater or lesser anticipated impact loads. In vehicle applications, including motorcycle and bicycle applications and particularly off-road applications, shock absorbers are pre-adjusted to account for varying terrain and anticipated speeds and jumps. Shocks are also adjusted according to certain rider preferences (e.g. soft-firm).

A type of integrated spring I damper shock absorber, having a gas spring, is shown in FIG. 28, for example, of U.S. Pat. No. 7,374,028, which is incorporated herein in its entirety by reference. The shock shown in FIG. 28 of the '028 patent also includes an "adjustable intensifier assembly 510." That intensifier or "reservoir" accepts damping fluid from chamber 170 as the fluid is displaced from that chamber by the incursion of rod 620 into chamber 170 during a compression stroke of the shock. The intensifier valve assembly regulates flow of damping fluid into and out of the reservoir, and an embodiment of the valve assembly is shown in FIG. 17 of the patent.

In some instances, reservoir portions of dampers are separate components whereby a separate chamber is provided for fluid expelled from the main chamber. A damper with such a remote reservoir is illustrated in FIG. 9 of the '028 patent incorporated herein. Other suspension systems use multiple, separate reservoir-type chambers that divide the usable dampening capability of the shock. In these designs, fluid is pushed from the main dampening cylinder and with valving, the reservoir chambers are utilized in various ways. By using one or both chambers, the travel available in the shock can be determined by a user. Configurations of multiple reservoir-type shocks are shown in U.S. Pat. No. 7,219,881, which is incorporated herein in its entirety by reference. The presently available dual reservoir designs have drawbacks. For example, utilization of both reservoirs is achieved solely by use of two separate and distinct paths between the main chamber and each of the reservoirs. Because each path has its own metering devices, especially in the rebound direction, there is always a potential of one of the reservoir chambers to lose fluid and "crash" when the metering devices are set differently.

What is needed is a multiple reservoir suspension system that ensures that each reservoir retains sufficient operating fluid. What is needed is a multiple reservoir system having simplified controls.

SUMMARY OF THE INVENTION

The present invention generally relates to a vehicle shock absorber comprising a main damper cylinder, a first reservoir and a second reservoir (although the principles herein may be extended to a third or more reservoirs as well). In one embodiment, a first operational mode includes a fluid path between the cylinder, optionally via a valve, and a first reservoir and then a path between the first and a second reservoir. In a second operational mode, a fluid path is utilized between the cylinder, optionally via a valve, and one of the reservoirs, the path excluding the other reservoir. Operation between the modes is user selectable.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of the invention and are therefore not to be considered limiting of its scope, for the invention may admit to other equally effective embodiments.

DETAILED DESCRIPTION

Figure 2:
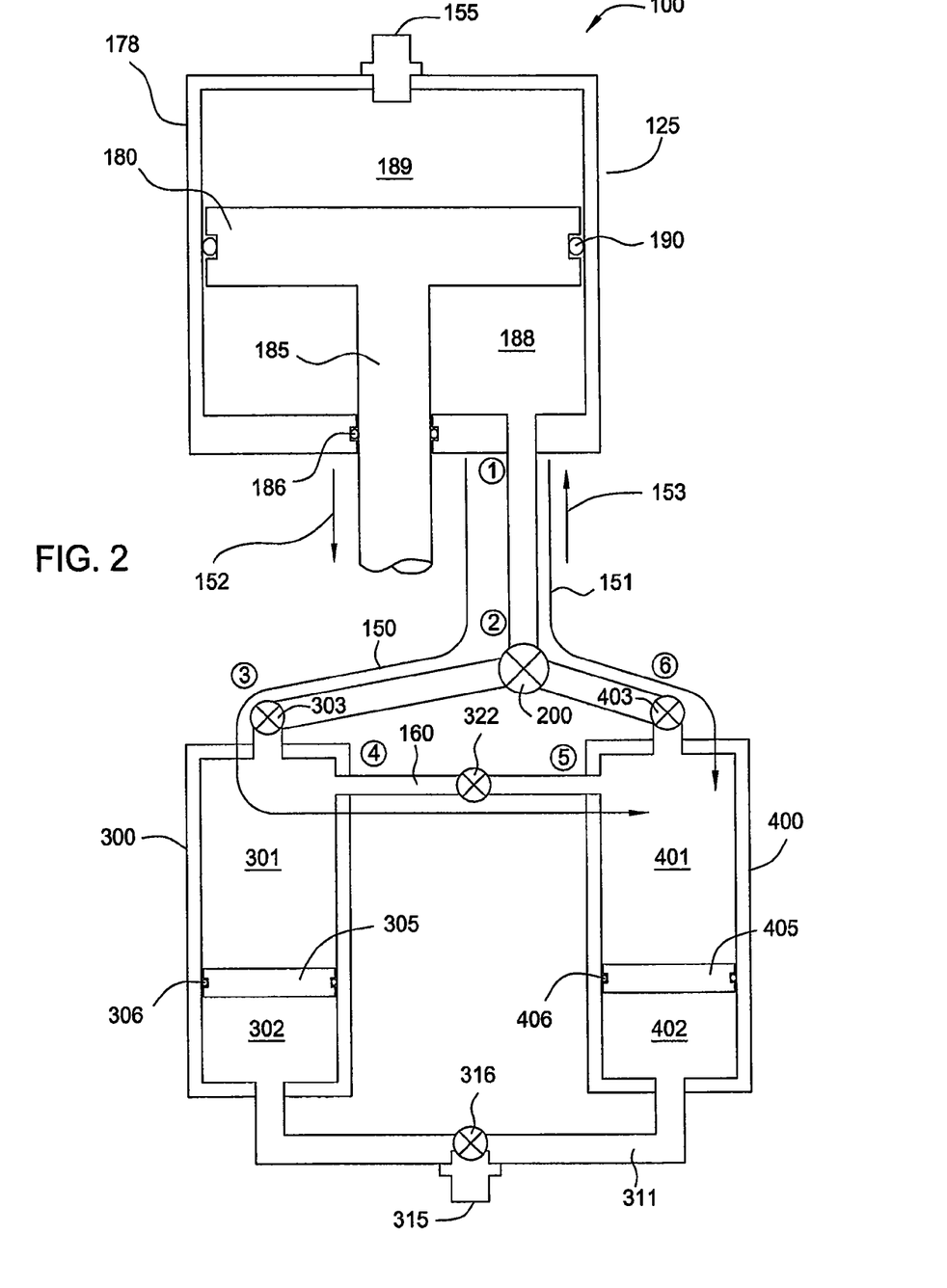
FIG. 2 is a schematic view of a damper with two reservoirs.

FIG. 2 is a schematic view of a shock absorber embodiment 100 that utilizes a main damper 125 and two reservoir chambers or Internal Floating Piston chambers (IFPs) 300, 400. Unlike the shock of FIG. 1, the shock embodiment of FIG. 2 operates as a "pull shock", which means the shock absorber gets pulled in tension to an extended condition as the suspension mechanism driving the shock reacts to compressive forces caused by terrain irregularities (bumps that compress the rear wheel toward the bicycle frame). Whether or not a shock absorber extends or compresses in response to compressive terrain features is a function of the suspension linkage in which the shock is mounted. In one embodiment, the oil chamber and gas chambers of the shock are in reversed placement relative to the main piston and shaft seal end of the main cylinder. With a "push shock", on the other hand, the shock absorber gets pushed to a shorter condition as the suspension mechanism driving the shock accommodates compressive terrain irregularities. Other than appearance and reversed operation, the principles of pull and push shocks remain substantially the same and the embodiments described and claimed herein are equally intended for both.

In one embodiment of the invention, a shock absorber is operatively mounted between an unsprung portion of a bicycle, such as the swing arm and rear axle, and a sprung portion of the bicycle such as the frame. A representative example embodiment of shock absorber derives from the shock absorber shown in FIG. 28 of, and elsewhere in, U.S. Pat. No. 7,374,028 which is incorporated herein by reference.

In the embodiment of FIG. 2, the main damper 125 has a piston 180 mounted on a shaft 185. The piston 180 is solid without the typical passages formed therethrough for the passage of fluid from one side of the piston 180 to the other side (although in some embodiments the piston may also include damping passages and valving). The shaft and piston assembly is fitted into a main cylinder 178. The cylinder is divided into a fluid (e.g. damping fluid, oil) chamber 188 and compressible fluid or gas (e.g. air, nitrogen) chamber 189 and this division is created by the solid piston, which seals on its OD with a seal such as an O-ring seal 190. The shaft 185 is also sealed where it extends a bulkhead of the main cylinder 178 with O-ring seal 186. When the shaft is pulled, the air chamber 189 within the cylinder becomes bigger (increases in volume) and the fluid chamber 188 within the cylinder becomes smaller. Fluid is pushed by the piston from the fluid chamber 188, through a compression damping circuit that includes a valve 200, and into one or both of the two IFP chambers 300, 400, as will be described herein. The first chamber 300 and second 400 IFP chambers are also each separated into a fluid chamber 301, 401 and an gas (e.g. air) chamber 302, 402 by a floating piston 305, 405 of each chamber 300, 400. In each case the floating piston is sealed within the chamber by a suitable seal such as an O-ring seal 306, 406. As fluid moves from the main cylinder fluid chamber 188 into the fluid chambers 301, 401, the IFP chambers 301, 401 increase in volume at the expense of the gas chamber 302, 402 volumes (as the gas chambers decrease in volume by movement of the floating pistons).

In use, gas pressure in the gas chamber 189 of the main cylinder 178 is adjustable using a fill valve 155. Gas pressure in the IFPs 300, 400 is also user-adjustable. As shown in one embodiment of FIG. 2, the gas volumes 302, 402 of the IFPs are in fluid communication with a single fill valve 315 via a communication path 311. In one embodiment, another valve 500 adjacent the fill valve 315, or integral therewith, is a Schrader-type valve for filling the first and second IFP air chambers 302, 402 to an equal pressure and then subsequently maintaining isolation of chambers 302 and 402 one from the other during use. The Schrader valve includes an axially movable stem member depressible to communicate with the first chamber through a first port and further depressible to communicate with the first and second chambers through a second port. In this manner, a single volume can be filled or preferably, both volumes, 302, 402 can be filled to an equal pressure in a single action by the user. Such an arrangement is shown and described in detail (see FIGS. 11, 12, 13) in Patent Application Publication No. US 2009/0236807 A1, assigned to the owner of the present invention, and that publication is incorporated herein by reference in its entirety.

Figure 3:
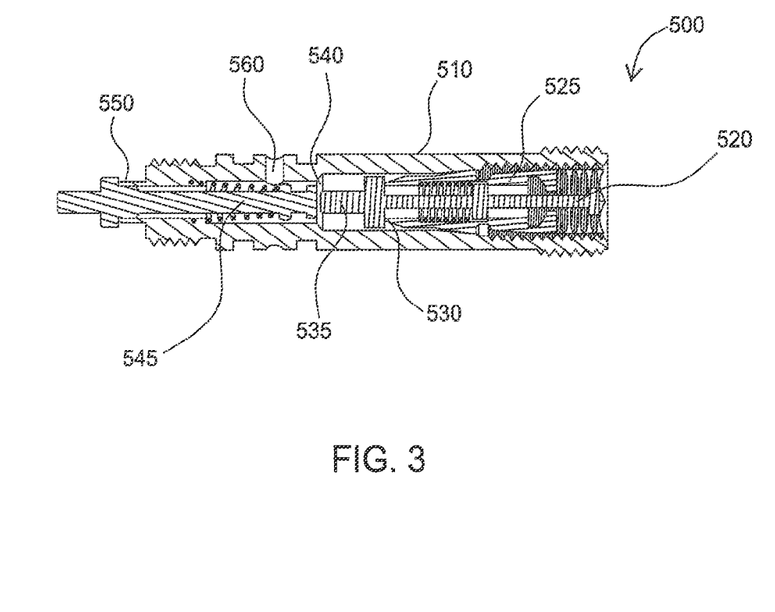
FIG. 3 is a section view of a Schrader-type valve.
Figure 4:
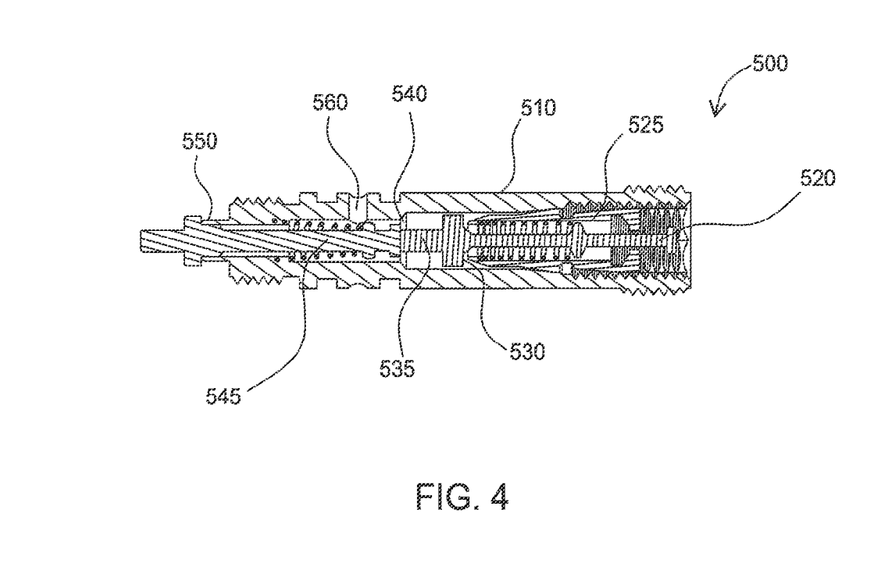
FIG. 4 is a section view of a Schrader-type valve.
Figure 5:
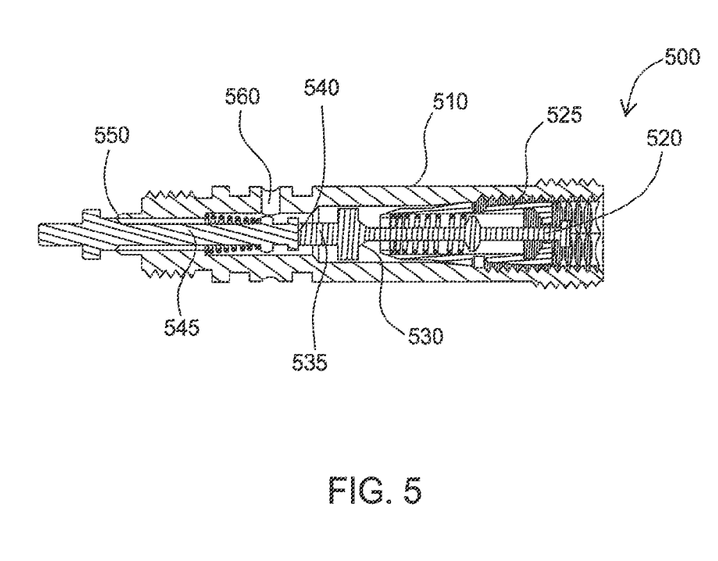
FIG. 5 is a section view of a Schrader-type valve.

In one embodiment utilizing the Schrader-type valve, the first 302 and second 402 volumes are filled by introducing pressure, from a suitable gas pump or other source of pressurized gas, into the gas fill valve 315 which includes or operates with, or is replaced by, a Schrader-type valve 500 as shown in FIGS. 3-5. Referring to FIG. 3, the valve 500 is designed to fill both of the first and second volumes with pressurized gas from the single valve body 510. In FIG. 3, the valve is closed with no communication of air therethrough.

In one aspect a valve stem 520 is connected through a valve core 525 to a primary fill valve 530 such that axial movement of the spring loaded valve stem 520 causes an opening of the primary fill valve 530 and axial movement of a valve pusher stem 535. Sufficient axial movement of the valve pusher stem 535 closes a gap 540 until the valve pusher stem 535 contacts the second chamber fill valve stem 545. Following such closure of the gap 540, further movement of the valve pusher stem 535 moves the second fill valve stem 545 and correspondingly separates the second fill valve 550 from a valve seat. The design ensures that sufficient axial movement of the valve stem 520 opens the primary fill valve 530 and further movement of the valve stem subsequently opens the second fill valve 550.

FIG. 4 illustrates a Schrader-type valve 500 with the valve stem 520 depressed and primary fill valve 530 open. In this position, pressurized air communicates through the valve 530 and to exit 560 formed in valve body 510 which preferably leads to the first gas volume 302. FIG. 5 illustrates the Schrader-type valve 500 with valve 530 open and gap 540 closed. Further, the second fill valve stem 545 has been axially depressed to open secondary fill valve 550. With the components of the Schrader-type valve in the position shown in FIG. 5, the first and second volumes 302, 402 can be filled simultaneously. Gap 540 can be sized to determine operative characteristics of the valve 500. For example, a gap of 0.050" in one embodiment leaves a gap of sufficient width that second chamber is not inadvertently filled along with the first chamber.

The valve stem 520 may be moved either mechanically, by a probe on a pressure fitting (not shown) of a pressurized gas source, or solely by the introduction of pressurized gas into the fill valve body 510 wherein the pressurized gas acts over the surface area (i.e. piston area) of the primary fill valve 530. In one embodiment, the dimension of the gap 540 is set such that movement of the valve stem 520 and primary fill valve 530, caused solely by the introduction of pressure, is not sufficient under normal operating pressures to close the gap 540 between the valve pusher stem 535 and the secondary fill valve stem 545. Correspondingly, only the primary fill valve 530 is opened allowing pressurized gas to be introduced into the first volume 302. Movement sufficient to close the gap 540 and open secondary fill valve 550 may be induced by a gas fill fitting (not shown) connected to the fill gas pressure source and having a protrusion or "stinger" in it that is dimensioned to move the valve stem a sufficient distance to close the gap and open the secondary fill valve 550. Alternatively, a fitting may be used without a stinger and the valve stem 520 may be moved by gas pressure from the fill gas pressure source. At certain lower velocities (based on lower fill gas pressures or introduction rates) the movement of the valve stem will be insufficient to open the secondary chamber fill valve and only the first volume will be filled. Conversely the respective porting of the valve assembly can be reversed (not shown) so that initial movement of the valve stem opens the second fill valve and further movement closes the gap and opens the primary fill valve.

Optionally, a mechanical probe, attached to a pressure hose fitting (not shown) for example, is used to move the valve stem 520. The length of the probe is sufficient to open the primary fill valve 530, close the gap 540, cause movement of the valve pusher stem 535 and secondary fill valve stem 545 and thereby open the secondary fill valve 550. Correspondingly, pressurized gas flows into the first volume 302 as previously described and also through the open secondary fill valve 350, permitting flow into the second volume 402.

In operation, the IFP gas pressure acts as the shock absorber main spring in one embodiment tending to resist extension of the "pull" shock, thereby providing a spring function for the shock absorber 100, while the main cylinder air chamber 189 acts as a shock absorber "negative spring" for the "pull" shock, tending to resist compression thereof and, by user adjustment, aiding in tailoring of gas spring curves by the user. The embodiment of FIG. 2 is designed whereby gas pressure in IFP cylinders 300, 400 will bias the piston 180 towards the closed end of the main cylinder 178.

In one embodiment valve 200 permits operation of the shock absorber of FIG. 2 in three different settings: full-travel, half-travel and lock out. The system is intended to be user-operable whereby the operator of the vehicle can shift the valve 200 between the three functions. In the full-travel setting, the oil is pushed by the piston 180 from the main cylinder 178 and along a path that is shown on schematic FIG. 2 as 150. The fluid extends through valve 200 to first IFP 300 and then, via a separate and direct communication path 160, to IFP 400. This setting makes both IFP gas chambers (and volumes) 302, 402 available as gas springs in operation of the shock absorber. Further, the fluid is transferred, during both extension and compression of the shock, along a path that includes the damping fluid reservoirs in series. Because of that, all of the reservoir damping liquid is available during the full stroke of the shock absorber on every stroke. Damping fluid communication directly between reservoirs ensures that the reservoirs remain relatively equalized (or at a known and predetermined operational differential) during operation and are not subject to unplanned and detrimental fluid fill fluctuations. Additionally, the sequential operation permits any metering of fluid to be performed at a single location so that there is no need (although optionally there may still be) to meter the fluid separately in each IFP reservoir.

In a second compression setting (e.g. "half-travel mode"), shown by path 151 of FIG. 2, oil flow to the first IFP chamber 300 is blocked at valve 200, causing all the pushed oil to flow into the second IFP chamber 400 and therefore changing the effective spring rate of the system (increasing the spring rate by decreasing the available IFP gas volume but therefore decreasing the available shock travel). The practical result of this half-travel setting is a stiffer-acting shock absorber.

A third compression setting includes the full closure of valve 200, effectively blocking oil flow to both IFP chambers 300, 400 and resulting in a shock absorber that is hydraulically locked out. The third setting is especially useful to prevent operation of the shock absorber in conditions when its operation is unnecessary or unwanted by a user. The valve 200 may include a "blow off" or pressure relief feature (optionally user adjustable) so that even when "locked out" the shock absorber may move in response to overpressure thereby avoiding damage to the shock or vehicle or user.

In some embodiments, the three compression settings described are selectable via user-accessible controls mounted adjacent components of the shock absorber 100 or remotely (with appropriate signal communication to the shock absorber such as cable, wire, or wireless with servo motors). For example, in one embodiment, a knob is adjustable between three positions corresponding to the full-travel, half-travel and lock out modes/positions described herein. In addition to the compression settings described, the shock absorber of the embodiment described also permits adjustment of operation in a rebound stroke (e.g. adjustment of rebound damping). In the first and second settings, the IFP gas pressure in 302, 402 pushes fluid out of the IFP chambers 300, 400 and back into the main cylinder fluid chamber 188 as the piston 180 is moved in a rebound direction (shown as arrow 153). Each IFP has an externally adjustable valve 303, 403 that allows the rebound flowing fluid to be metered, resulting in different rebound fluid flow speeds. In one embodiment, the rebound fluid is divided between the adjustable valves and factory set shims (not shown). The valves 303, 403 permit a user to change the operational aspects of the IFPs for proper suspension depending on, among other things, road/trail conditions and loads. In each setting, both IFP cylinder oil chambers 301, 401 flow their rebound flow oil back to the main cylinder 178 through one common rebound adjustor valve and flow path. For example, in full-travel mode, all rebound fluid travels through and can be adjusted at valve 303 of IFP 300. In half-travel mode, all fluid travels back towards the main damper 125 via valve 403 of IFP 400.

Explaining the operation of some embodiments in more detail, the movement of oil flow out of the main cylinder oil chamber 188 (compression flow shown as arrow 152) and oil back into the main cylinder oil chamber 188 (rebound flow 153) will be elaborated upon by example. In the first compression setting (full-travel mode) and under compression flow, oil will flow into the first IFP 300. Referring to FIG. 2 the full-travel mode flow path 150 comprises nodes 1-5 of FIG. 2. The IFP oil chambers 301, 401 will communicate with one another via fluid path 160 (nodes 4-5 including valve 322) connecting them. This fluid path includes valve 322 that allows flow to communicate in both directions between the IFP oil chambers 300, 400 when the shock is set in this first, full-travel compression setting. The compression damping and the rebound damping in the full-travel compression setting will each be unique to this setting as the compression oil flow and rebound oil flow are directed into and out of only one of the IFP chambers (IFP 300 via node 3) upstream of the fluid path 160 that permits both IFP chambers to communicate. A rebound adjustor valve 303 provided in path 3-2 controls and adjusts the rebound flow for this full-travel setting. Shimmed or valved (shims being an example valve type) compression and shimmed or valved rebound damping (not shown) are also provided in path 3-2 specifically for the full-travel setting.

When the shock is set to the half-travel setting, compression flow is directed to second IFP 400 along path 151 as shown in FIG. 2. Note that only the gas IFP 400 is compressed because the IFP gas chambers are isolated from each other. Valve 322 in fluid path 160 is closed in this setting in the direction of IFP 400 to 300. A low speed rebound adjustor 403 is provided in path 151 to control low speed rebound damping for this second compression setting condition, and distinct shimmed compression damping (not shown) and rebound damping are provided in path 151 specifically for this second, half-travel setting. Compression flow is now directed only into IFP 400 and rebound flow is supplied only from IFP 400. While the operation is described utilizing the IFPs 300, 400 in a particular manner it will be understood that the chambers 300, 400 could be reversed in function and sequencing.

The described embodiment provides half or full-travel operation and in each case, the rebound flow of fluid moves in a single path and is metered at a single location, thus avoiding a problem of prior art arrangements that leads one IFP crashing because it receives less fluid than it expels due to unequal metering.

Figure 6:
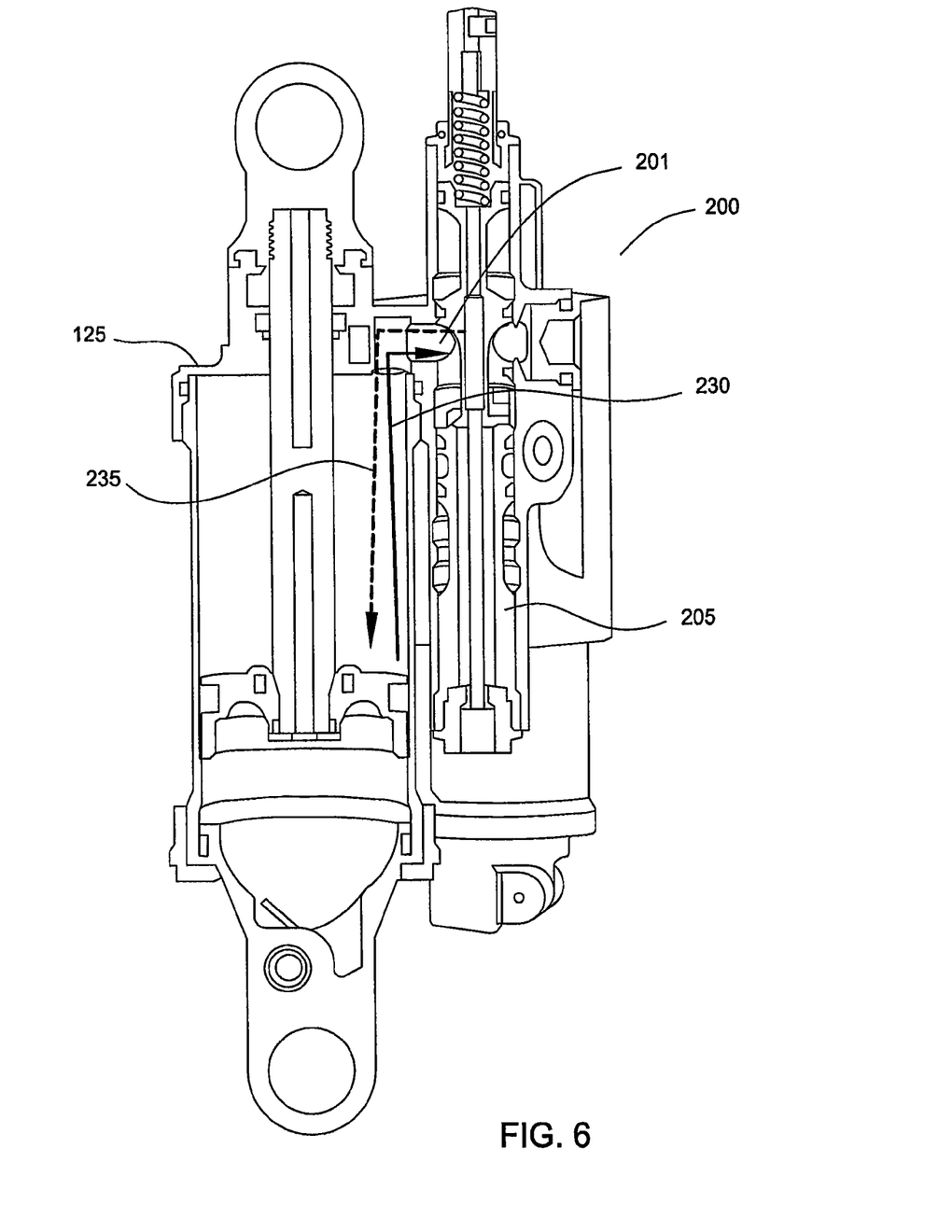
FIG. 6 is a section view showing a damper cylinder with a valve adjacent thereto and fluid paths between the damper cylinder and valve.
Figure 7:
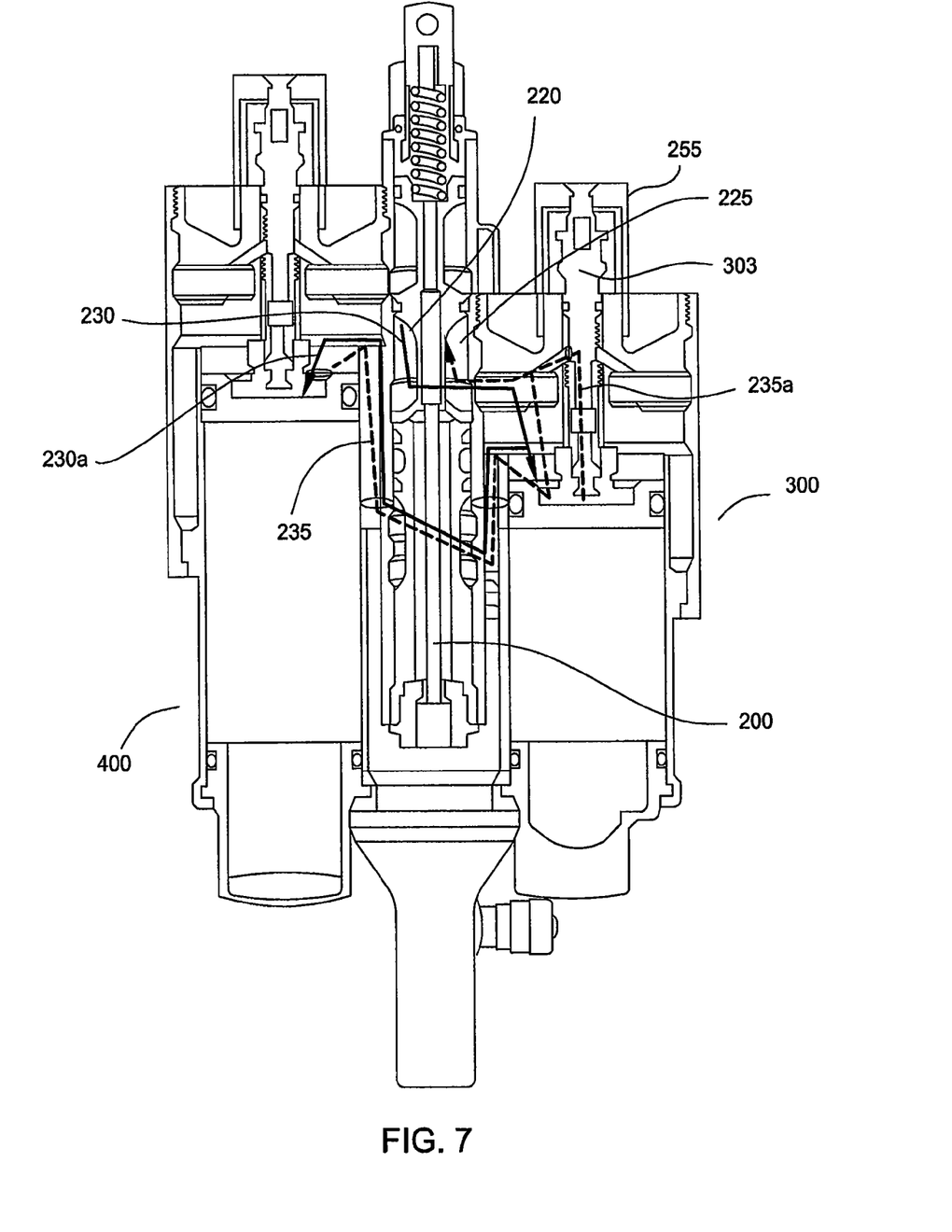
FIG. 7 is a section view showing a valve and two reservoirs with fluid paths therebetween in a "full-travel" mode of the shock absorber.
Figure 8:
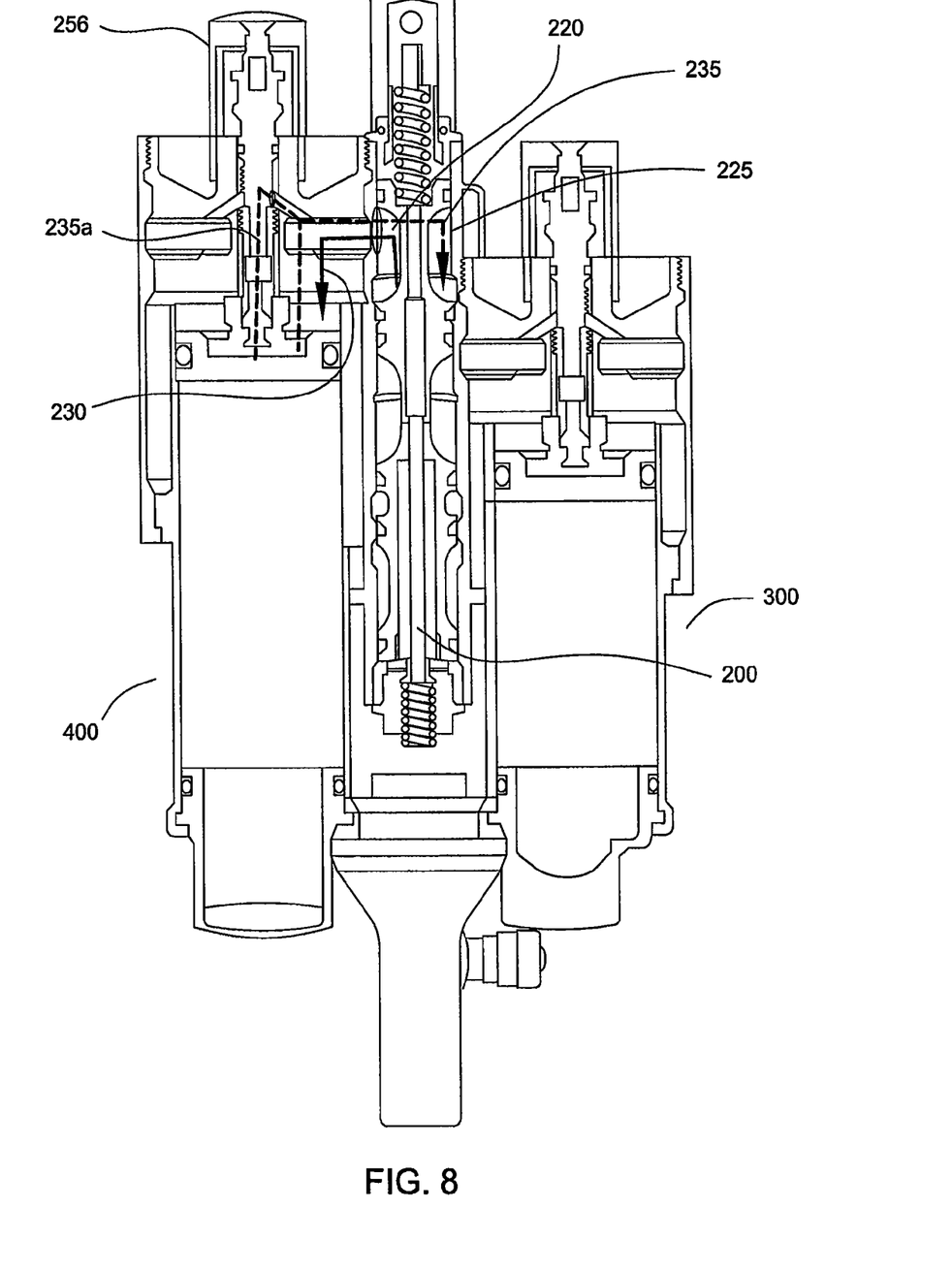
FIG. 8 is a section view showing the valve and two reservoirs with fluid paths therebetween in a "half-travel" mode.

FIGS. 6-9 are section views showing portions of a suspension system that include some of the embodiments described herein. FIGS. 6-7, for example illustrate the flow of fluid within the shock in full-travel mode whereby both of the IFPs 300, 400 are utilized in the operation. FIG. 8 illustrates fluid flow in half-travel mode, wherein only one of the IFPs (400) is utilized.

FIG. 6 shows the path of fluid between the main damper 125 and valve 200, which in the case of FIG. 6, is a spool valve (e.g. in one embodiment a single valve member having multiple functions) with a central shaft 205 for directing fluid in a variety of different directions depending upon the axial location of the shaft 205 relative to the valve body and ports 220, 225 (FIG. 7) connecting the valve to the IFPs 300, 400. In FIG. 6, a port 201 is visible for providing fluid communication between the main damper 125 and valve 200. In each FIG. 6-9, fluid travel in a compression mode of the damper is shown by a solid line/arrow 230 while fluid travel in the rebound mode is shown by a dotted line/arrow 235. In FIG. 6, solid line 230 illustrates the path of fluid during a compression stroke as fluid leaves the damper 125 and moves into the valve 200 from which it will travel to both IFPs 300, 400. FIG. 7 corresponds to FIG. 6 and shows fluid travel 230 from a port 220 in the spool valve 200 directly to a first IFP 300. A separate path 230a is utilized to carry fluid from IFP 300 to IFP 400 through path 160 which in the embodiment of FIG. 7, is included in spool valve 200. In the embodiment shown in the section views, valve 322, controlling fluid flow in flow path 160 (FIG. 2) is also incorporated into the spool valve 200 and the path of fluid through that path is determined by a setting of the valve.

Following the path of the dotted line 235, it will be appreciated that a portion of the fluid 235a traveling out of (rebounding) IFP 300 can be metered by rebound needle valve 303 (FIG. 2) that is adjustable by a user via adjustment knob 255 accessible at an upper end of the IFP 300. Another portion of the rebound fluid 235 is metered by shims (not shown).

FIG. 8 is a section view of the spool valve 200 and the IPOs 300, 400 and illustrates the half-travel mode when only a single IFP 400 is utilized by the system. As shown in the Figure, fluid travel between the valve and IFP 400 while IF 300 is not utilized. In the half-travel mode, only the gas spring portion of one IFP 400 is used and the system therefore operates with stiffer characteristics. Of note is the rebound path of the fluid (dotted line 235) wherein a portion of the fluid travels through another needle-type valve 403 (FIG. 2) that is adjustable via knob 256, thereby permitting the rebound characteristics of the shock to be user-adjusted in the half-travel mode.

Figure 9:
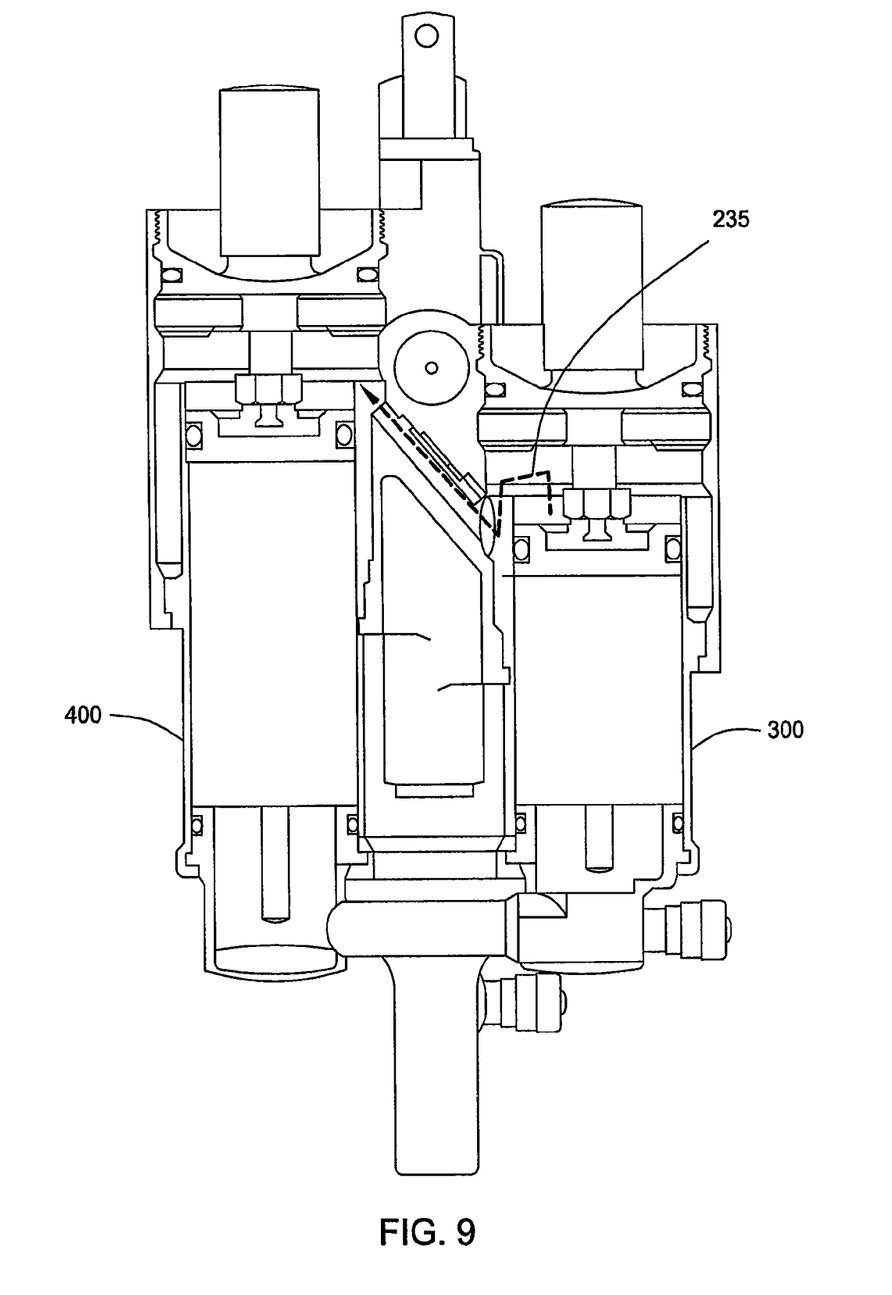
FIG. 9 is a section view showing a rebound pathway for fluid between the reservoirs.

FIG. 9 is another section view showing both IFPs and the previously discussed fluid path between them (valve C) having a one-way characteristic in which fluid may travel from IFP 300 to IFP 400 in half-travel mode of operation. The feature permits fluid in a non-used IFP to move to the other IFP so it can be utilized in operation of the shock absorber.

The forgoing description and the Figures illustrate and teach a shock absorber using one or more of multiple IFPs to provide differing and adjustable amounts of a spring function when the shock absorber operates. In a dual IFP reservoir embodiment one mode provides that two IFPs are used in a sequential manner whereby the fluid travels a path between them from one to the next. In a rebound stroke of the shock absorber the fluid travels back along the same or similar path, thereby providing a single point of metering and avoiding some drawbacks of earlier designs, most notably the possibility of an IFP locking up due to expulsion of all of its fluid due to differing amounts of metering of the rebound fluid. In one embodiment the flow path between reservoirs includes a one way flowing check valve disposed to check fluid flow entering the reservoir unused during half travel mode but allowing fluid to flow from that cylinder to the half travel damping reservoir. In that way, any fluid trapped in the unselected cylinder while changing from full travel to half travel can freely flow back to the main cylinder, or otherwise into the selected damping circuit, as needed but no new fluid will be introduced into the unselected reservoir during half travel operation. It is noteworthy that several other flow options and combinations are available in the shown embodiments.

While the foregoing is directed to embodiments of the present invention, other and further embodiments of the invention may be devised without departing from the basic scope thereof, and the scope thereof is determined by the claims that follow.

What we claim is:

1. A shock absorber comprising:
    a main damper cylinder having a variable volume portion with fluid therein;
    a first reservoir and a second reservoir;
    a first fluid flow path extending from the variable volume portion to a first valve;
    a second fluid flow path extending from the first valve to the first reservoir;
    a third fluid flow path extending from the first valve to the second reservoir;
    a fourth fluid flow path extending between the first reservoir and the second reservoir independent of the first, second and third fluid flow paths, the fourth fluid flow path having a fourth fluid flow path valve positioned therein to selectively open and close the fourth fluid flow path, wherein the shock absorber is operable in a first operational mode wherein fluid travels only from the variable volume portion of the main damper cylinder to the first reservoir utilizing the first fluid flow path and the second fluid path and, fluid travels from the first reservoir to the second reservoir utilizing only the fourth fluid flow path, said shock absorber further operable in a second operational mode wherein fluid travels from the variable volume portion of the main damper cylinder to the second reservoir utilizing the first fluid flow path and the third fluid flow path, said shock absorber further operable in a third operational mode wherein said fluid is prevented from travelling from said variable volume portion of said main damper cylinder to said first reservoir and said fluid is also prevented from travelling from said variable volume portion of said main damper cylinder to said second reservoir; and
    user-accessible controls coupled to said shock absorber, said user-accessible controls for selecting between said first operational mode, said second operational mode, and said third operational mode, wherein said first operational mode is a full-travel mode, and said third operational mode is a lock-out mode.

2. The shock absorber of claim 1 wherein said user-accessible controls are mounted adjacent components of said shock absorber.

3. The shock absorber of claim 1 wherein said user-accessible controls are mounted remotely from said shock absorber.

4. The shock absorber of claim 1 wherein said user-accessible controls are mounted remotely from said shock absorber and wherein said user-accessible controls are coupled to said shock absorber via signal communication means selected from the group consisting of: cable, wire, or wireless communication with servo motors.

5. The shock absorber of claim 1 wherein said user-accessible controls include a knob adjustable between three positions corresponding to said first operational mode, said second operational mode, and said third operational mode respectively.

6. The shock absorber of claim 1 wherein said first reservoir further comprises:
    a fluid chamber;
    a gas chamber; and
    a floating piston separating said fluid chamber and said gas chamber.

7. The shock absorber of claim 1 wherein said second reservoir further comprises:
    a fluid chamber;
    a gas chamber; and
    a floating piston separating said fluid chamber and said gas chamber.

8. The shock absorber of claim 1, said first reservoir further comprising:
    a first reservoir fluid chamber;
    a first reservoir gas chamber; and
    a first reservoir floating piston separating said first reservoir fluid chamber and said first reservoir gas chamber; and
said second reservoir further comprising:
    a second reservoir fluid chamber;
    a second reservoir gas chamber; and
    a second reservoir floating piston separating said second reservoir fluid chamber and said second reservoir gas chamber.

9. The shock absorber of claim 8, further comprising a fill valve fluidically coupled to said first reservoir gas chamber and said second reservoir gas chamber.

10. The shock absorber of claim 8, wherein pressure in said first reservoir gas chamber and pressure in said second reservoir gas chamber are user-adjustable.

11. The shock absorber of claim 9, wherein said fill valve is structured to permit pressure in said first reservoir gas chamber to be adjusted concurrently with adjusting of pressure in said second reservoir gas chamber.

12. The shock absorber of claim 1 further comprising:
a first operational mode rebound fluid path;
a second operational mode rebound fluid path; and
a third operational mode rebound fluid path.

13. The shock absorber of claim 12 further comprising:
a rebound valve disposed along said first operational mode rebound fluid path, wherein at least a portion of said first operational mode rebound fluid path is meterable by said rebound valve.

14. The shock absorber of claim 12 further comprising:
a rebound valve disposed along said second operational mode rebound fluid path, wherein at least a portion of said second operational mode rebound fluid path is meterable by said rebound valve.

15. The shock absorber of claim 1, wherein said shock absorber is a pull shock.

16. The shock absorber of claim 1, wherein said shock absorber is a push shock.

* * * * *